US007319537B2

(12) United States Patent
Kikuchi et al.

(10) Patent No.: US 7,319,537 B2
(45) Date of Patent: Jan. 15, 2008

(54) CHARGING MANAGEMENT APPARATUS, PERIPHERAL DEVICE USING APPARATUS, CHARGING MANAGEMENT SYSTEM, CHARGING MANAGEMENT METHOD, CHARGING DISPLAY METHOD, STORAGE MEDIUM, AND PROGRAM

(75) Inventors: Koji Kikuchi, Kanagawa (JP); Masashi Kuroshima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1078 days.

(21) Appl. No.: 10/136,709

(22) Filed: May 1, 2002

(65) Prior Publication Data

US 2002/0167684 A1 Nov. 14, 2002

(30) Foreign Application Priority Data

May 14, 2001 (JP) ............................. 2001-143116

(51) Int. Cl.
G06F 15/00 (2006.01)
(52) U.S. Cl. ................. 358/1.15; 358/1.13; 379/100.04
(58) Field of Classification Search ............... 358/1.15, 358/1.13; 379/100.04
See application file for complete search history.

(56) References Cited

U.S. PATENT DOCUMENTS

| 6,590,671 | B1* | 7/2003 | Kinjo ......................... 358/1.12 |
| 6,629,635 | B1* | 10/2003 | Akamine ..................... 235/375 |
| 6,675,153 | B1* | 1/2004 | Cook et al. ................... 705/74 |
| 6,735,626 | B1* | 5/2004 | Tezuka et al. ............... 709/223 |
| 6,908,238 | B2* | 6/2005 | Ashizaki ....................... 400/61 |
| 6,944,667 | B1* | 9/2005 | Curtis ......................... 709/229 |
| 6,978,299 | B1* | 12/2005 | Lodwick ..................... 709/223 |
| 6,996,534 | B2* | 2/2006 | Hamaguchi et al. .......... 705/14 |
| 7,019,861 | B2* | 3/2006 | Aagesen .................... 358/1.15 |
| 7,038,801 | B2* | 5/2006 | Kurozasa et al. .......... 358/1.15 |
| 7,043,458 | B2* | 5/2006 | Kimura ....................... 705/400 |
| 7,130,067 | B1* | 10/2006 | Shibasaki .................. 358/1.15 |
| 7,143,204 | B1* | 11/2006 | Kao et al. ..................... 710/18 |
| 2003/0023732 | A1* | 1/2003 | Cohen ........................ 709/229 |

* cited by examiner

*Primary Examiner*—Twyler Lamb
*Assistant Examiner*—Benjamin Dulnaey
(74) *Attorney, Agent, or Firm*—Cowan, Liebowitz & Latman, P.C.

(57) ABSTRACT

A charging management apparatus which allows constructing a charging system corresponding to various conditions when a plurality of apparatuses share a locally connected image reading apparatus and also allows use of the locally connected image reading apparatus as a chargeable peripheral device is disclosed. An image reading apparatus sharing server (302) serving as a charging management apparatus stores and manages a charging setting information structure based on charging setting related to sharing of an image reading apparatus (301) by a client PC (303), responds to a charging setting information structure acquisition inquiry from the client PC (303), collects, stores, and manages use information related to sharing of the image reading apparatus (301) from the client PC (303), and calculates, stores, and manages a charging result for actual use of the image reading apparatus (301) on the basis of the use information and charging setting information structure.

4 Claims, 11 Drawing Sheets

FIG. 4

CHARGING SETTING

401 — ☐ CHARGE (C)

401 — CHARGING CONDITION (J):

| CLASSIFICATION | TARGET | PRICE | REMARKS |
|---|---|---|---|
| USER | HONGO | ¥100/TIME | |
| USER | FUJISAWA | ¥80/SHEET | |
| GROUP | FIRST ACCOUNTING SECTION | ¥1,000/100 SHEETS | SEND NOTIFICATION FOR EVERY 100 SHEETS |

403 — CLASSIFICATION
404 — TARGET
405 — (GROUP row)
406 — ADD (A)
407 — DELETE (D)

OK    CANCEL

CHARGING MANAGEMENT APPARATUS, PERIPHERAL DEVICE USING APPARATUS, CHARGING MANAGEMENT SYSTEM, CHARGING MANAGEMENT METHOD, CHARGING DISPLAY METHOD, STORAGE MEDIUM, AND PROGRAM

FIELD OF THE INVENTION

The present invention relates to a charging management apparatus, peripheral device using apparatus, charging management system, charging management method, charging display method, storage medium, and program and, more particularly, to a charging management apparatus, peripheral device using apparatus, charging management system, charging management method, charging display method, storage medium, and program, which are preferably applied to charging management of an image reading apparatus serving as one of peripheral devices in a system which is designed to be capable of data communication between a plurality of personal computers (PCs) and a plurality of peripheral devices through a predetermined communication medium.

BACKGROUND OF THE INVENTION

Along with the recent proliferation of information processing apparatuses such as computers and peripheral devices such as printers, image reading apparatuses (scanners), and digital cameras, networks such as LANs (Local Area Networks) are also becoming popular. It is also becoming necessary to share printers, modems, and image reading apparatuses on networks. When peripheral devices such as printers and image reading apparatuses are shared on a network, the environment allows use of all devices on the network. When various kinds of peripheral devices are shared, charging management is done.

However, the above-described prior art has the following problems. When an image reading apparatus which is locally connected (i.e., connected not to a network but to a predetermined apparatus) and has no charging processing function is shared, charging management for use of this locally connected image reading apparatus is impossible. Conventionally, there is a demand for charging management for use of a locally connected image reading apparatus.

On the other hand, to determine whether a user will be charged for use of an individual usable image reading apparatus, the user side must inquire of the manager of the image reading apparatus to be used. Hence, a display system that allows users to visually understand whether they will be charged for use of an image reading apparatus is conventionally required to be implemented.

SUMMARY OF THE INVENTION

The present invention has been made in consideration of the above-described situation, and has as its object to provide a charging management apparatus, peripheral device using apparatus, charging management system, charging management method, charging display method, storage medium, and program, which allow constructing a charging system corresponding to various conditions when a plurality of apparatuses share a locally connected image reading apparatus, and also allow using the locally connected image reading apparatus, for which charging management has conventionally been impossible, as a chargeable peripheral device.

The present invention has been made in consideration of the above-described situation, and has as its object to provide a charging management apparatus, peripheral device using apparatus, charging management system, charging management method, charging display method, storage medium, and program, which allow providing to a user visual information representing whether he will be charged for use of a shared image reading apparatus at the apparatus of his own in displaying the shared image reading apparatus, and allow the user who is going to use the shared image reading apparatus to easily grasp that he will be charged for use of the image reading apparatus by charging processing and to use a desired shared image reading apparatus without inquiring of the manager of an individual shared image reading apparatus about charging.

That is, a subject of the present invention is to provide a charging management apparatus which is connected to a communication medium and an image reading apparatus to manage use of the image reading apparatus by a plurality of peripheral device using apparatuses connected to the communication medium, comprising: collection means for collecting use information related to use of the image reading apparatus from each of the peripheral device using apparatuses; calculation means for calculating charging information for use of the image reading apparatus by each peripheral device using apparatus on the basis of the collected use information and a charging setting information structure corresponding to charging setting related to sharing of the image reading apparatus by each peripheral device using apparatus; and charging management means for storing and managing the calculated charging information.

It is another subject of the present invention to provide a peripheral device using apparatus designed to be capable of data communication, through a communication medium, with a charging management apparatus which provides sharing of an image reading apparatus, comprising: acquisition means for acquiring a charging setting information structure related to sharing of the image reading apparatus from the charging management apparatus; charging information management means for storing and managing the acquired charging setting information structure; charging setting determination means for determining on the basis of the charging setting information structure whether a user is to be charged for use of the image reading apparatus; and display control means for, when it is determined that the user is to be charged for use of the image reading apparatus, displaying a charging mark added to an icon that represents the image reading apparatus.

Furthermore, it is another subject of the present invention to provide a charging management system in which a plurality of peripheral device using apparatuses are designed to be capable of data communication, through a communication medium, with a charging management apparatus which is connected to an image reading apparatus and provides sharing of the image reading apparatus to the peripheral device using apparatuses, wherein the charging management apparatus collects use information related to sharing of the image reading apparatus from each of the peripheral device using apparatuses, calculates charging information for actual use of the image reading apparatus by each peripheral device using apparatus on the basis of the collected use information and a charging setting information structure corresponding to charging setting related to sharing of the image reading apparatus by each peripheral device using apparatus and stores and manages the calculated charging information.

Furthermore, it is another subject of the present invention to provide a charging management system in which a peripheral device using apparatus is designed to be capable of data communication, through a communication medium, with a charging management apparatus which provides sharing of an image reading apparatus, wherein the peripheral device using apparatus comprises acquisition means for acquiring a charging setting information structure related to sharing of the image reading apparatus from the charging management apparatus; charging information management means for storing and managing the acquired charging setting information structure; charging setting determination means for determining on the basis of the charging setting information structure whether a user is to be charged for use of the image reading apparatus; and display control means for, when it is determined that the user is to be charged for use of the image reading apparatus, displaying a charging mark added to an icon that represents the image reading apparatus.

Furthermore, it is another subject of the present invention to provide a charging management method executed by a charging management apparatus which is connected to an image reading apparatus and designed to be capable of data communication with a plurality of peripheral device using apparatuses connected to a communication medium and provides sharing of the image reading apparatus to the peripheral device using apparatuses, comprising the steps of: collecting use information related to sharing of the image reading apparatus from each of the peripheral device using apparatuses; calculating charging information for actual use of the image reading apparatus by each peripheral device using apparatus on the basis of the collected use information and a charging setting information structure corresponding to charging setting related to sharing of the image reading apparatus by each peripheral device using apparatus; and storing and managing the calculated charging information.

Furthermore, it is another subject of the present invention to provide a charging display method executed by a peripheral device using apparatus designed to be capable of data communication, through a communication medium, with a charging management apparatus which provides sharing of an image reading apparatus, comprising the steps of: acquiring a charging setting information structure related to sharing of the image reading apparatus from the charging management apparatus; storing and managing the acquired charging setting information structure; determining on the basis of the charging setting information structure whether a user is to be charged for use of the image reading apparatus; and when it is determined that the user is to be charged for use of the image reading apparatus, displaying a charging mark added to an icon that represents the image reading apparatus.

Furthermore, it is another subject of the present invention to provide a storage medium which stores a program to be supplied to a charging management apparatus which is connected to an image reading apparatus and designed to be capable of data communication with a plurality of peripheral device using apparatuses connected to a communication medium and provides sharing of the image reading apparatus to the peripheral device using apparatuses, wherein the program comprises the steps of: collecting use information related to sharing of the image reading apparatus from each of the peripheral device using apparatuses; calculating charging information for actual use of the image reading apparatus by each peripheral device using apparatus on the basis of the collected use information and a charging setting information structure corresponding to charging setting related to sharing of the image reading apparatus by each peripheral device using apparatus; and storing and managing the calculated charging information.

Furthermore, it is another subject of the present invention to provide a storage medium which stores a program to be supplied to a peripheral device using apparatus designed to be capable of data communication, through a communication medium, with a charging management apparatus which provides sharing of an image reading apparatus, wherein the program comprises the steps of: acquiring a charging setting information structure related to sharing of the image reading apparatus from the charging management apparatus; storing and managing the acquired charging setting information structure; determining on the basis of the charging setting information structure whether a user is to be charged for use of the image reading apparatus; and when it is determined that the user is to be charged for use of the image reading apparatus, displaying a charging mark added to an icon that represents the image reading apparatus.

Furthermore, it is another subject of the present invention to provide a program product supplied to a charging management apparatus which is connected to an image reading apparatus and designed to be capable of data communication with a plurality of peripheral device using apparatuses connected to a communication medium and provides sharing of the image reading apparatus to the peripheral device using apparatuses, comprising the steps of: collecting use information related to sharing of the image reading apparatus from each of the peripheral device using apparatuses; calculating charging information for actual use of the image reading apparatus by each peripheral device using apparatus on the basis of the collected use information and a charging setting information structure corresponding to charging setting related to sharing of the image reading apparatus by each peripheral device using apparatus; and storing and managing the calculated charging information.

Furthermore, it is another subject of the present invention to provide a program product supplied to a peripheral device using apparatus designed to be capable of data communication, through a communication medium, with a charging management apparatus which provides sharing of an image reading apparatus, comprising the steps of: acquiring a charging setting information structure related to sharing of the image reading apparatus from the charging management apparatus; storing and managing the acquired charging setting information structure; determining on the basis of the charging setting information structure whether a user is to be charged for use of the image reading apparatus; and when it is determined that the user is to be charged for use of the image reading apparatus, displaying a charging mark added to an icon that represents the image reading apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is an explanatory view showing a display example of a charging setting window for setting charging for sharing of the image reading apparatus according to the first embodiment of the present invention;

DETAILED DESCRIPTION OF THE PREFERRED EMBODIMENTS

Figure 1:
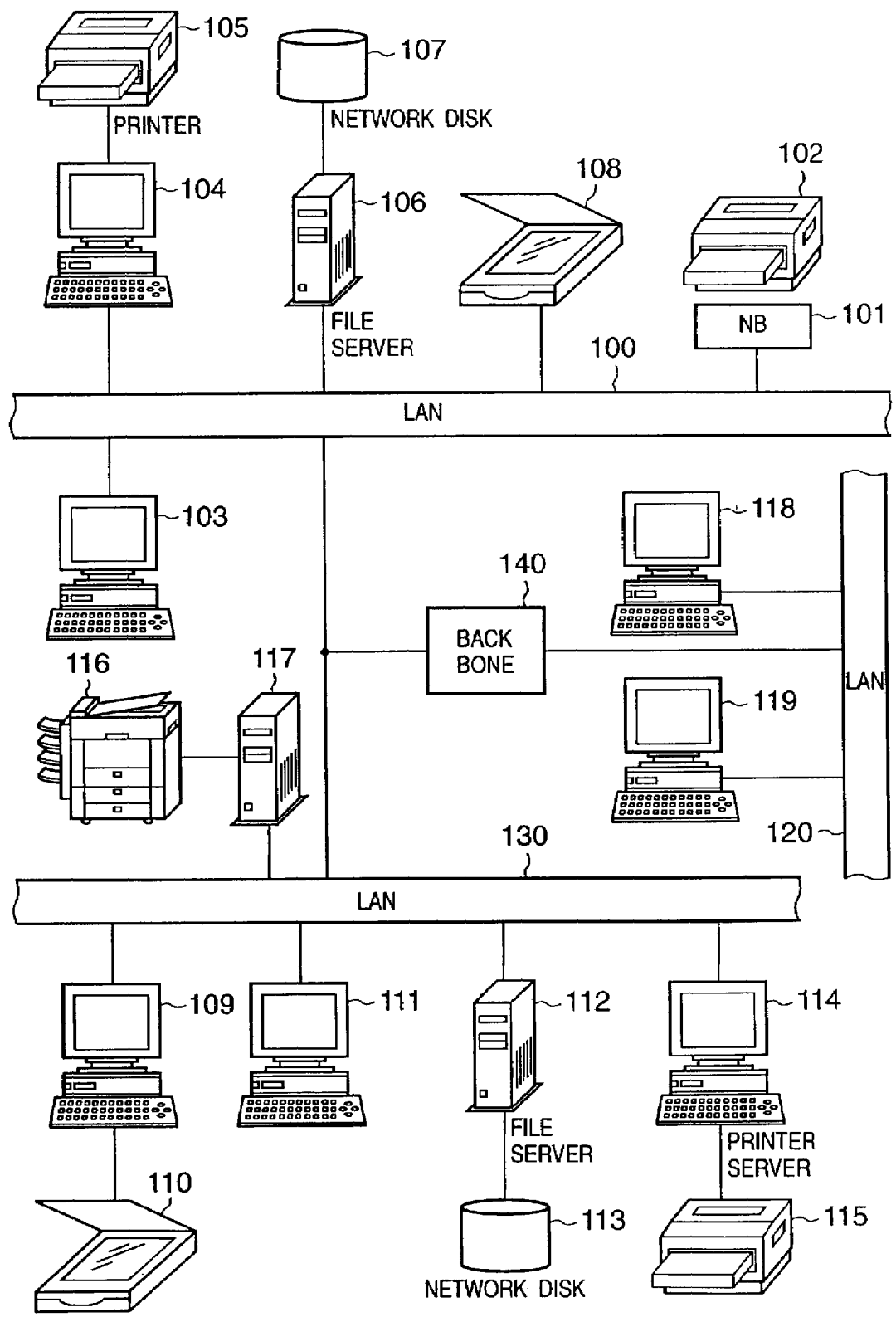
FIG. 1 is a diagram showing the arrangement of an information processing system constituted by network devices including an information processing apparatus according to the first and second embodiments of the present invention.

Preferred embodiments of the present invention will now be described in detail in accordance with the accompanying drawings.

An outline of the present invention will be described before a description of the embodiments of the present invention.

In the present invention, to manage charging even for use of a locally connected image reading apparatus, when the locally connected image reading apparatus is shared, charging setting is prepared as a set item, and the content of sharing is acquired and collated with charging setting information to generate charging data in a data processing apparatus on the side that shares the locally connected image reading apparatus.

To implement this, the charging management apparatus of the present invention has the following arrangement. The data processing apparatus capable of data communication with various PCs connected to a predetermined communication medium (LAN 100, 120, or the like shown in FIG. 1) comprises a means for causing a display section (CRT 216 shown in FIG. 2) to display sharing setting and charging setting for sharing, as a characteristic feature of the present invention, in sharing a locally connected image reading apparatus, a means for acquiring a content (charging setting information structure) set for the displayed charging setting window, a means for acquiring use information of another PC for the sharing setting content (the charging setting information structure is acquired by causing a CPU 202 shown in FIG. 2 to execute a control program stored in advance and perform communication processing), a means for generating charging result data for actual use from the acquired charging setting information structure, a means for storing and managing the charging setting information structure, actual use information, and charging result data (the charging setting information structure, actual use information, and charging result data are managed through memories such as a hard disk 210 and PMEM (program memory) 203 by causing the CPU 202 shown in FIG. 2 to execute a control program stored in advance), and a means for responding to a charging setting information structure acquisition request for another PC.

Additionally, in the present invention, to make a user to easily visually understand whether he will be charged for use of each individual image reading apparatus, a charging setting information structure is acquired from an individual image reading apparatus, it is determined from the content of the charging setting information structure whether use of the image reading apparatus is free, and the determination result is displayed as a mark on an icon on the display section of the shared image reading apparatus, thereby allowing the user who is going to use the shared image reading apparatus to easily grasp in advance that he will be charged for use of the image reading apparatus by charging processing.

To implement this, the data processing apparatus of the present invention has the following arrangement. The data processing apparatus capable of data communication with various PCs and various peripheral devices connected to a predetermined communication medium (LAN 100, 120, or the like shown in FIG. 1) comprises a means for acquiring a resource information structure, the statuses of various peripheral devices, and a charging setting information structure related to use of a shared image reading apparatus, as a characteristic feature of the present invention (the pieces of information are acquired by causing the CPU 202 shown in FIG. 2 to execute a control program stored in advance and perform communication processing), a means for storing and managing the acquired resource information structure, statuses of various peripheral devices, and charging setting information structure (the pieces of information are managed through the memories such as the hard disk 210 and PMEM 203 by causing the CPU 202 shown in FIG. 2 to execute the stored control program), a means for displaying icons of various PCs and various peripheral devices for each function in displaying the system arrangement on the basis of the stored and managed resource information structure, statuses of various peripheral devices, and charging setting information structure, a means for determining on the basis of the charging setting information structure whether use of an individual image reading apparatus is free, a means for displaying a mark representing the determination result content on the icon, and a means for causing the display section (CRT 216 shown in FIG. 2) to display each icon connected to a virtual network path (a virtual system arrangement display window is displayed on the CRT 216 by causing the CPU 202 shown in FIG. 2 to execute the control program stored in advance).

The first and second embodiments of the present invention will be described below in detail with reference to the accompanying drawings.

Description of Arrangement Common to First and Second Embodiments

FIG. 1 is a diagram showing the arrangement of an information processing system constituted by a plurality of network devices including an information processing apparatus (data processing apparatus) that operates as a charging management apparatus and peripheral device using apparatus of the present invention. This information processing system comprises a network board (NB) 101, network printer 102, personal computers (PCs) 103, 104, 111, and 118, printers 105 and 115, file servers (PCs) 106 and 112, network disks 107 and 113, image reading apparatus (network scanner) 108, scanner sharing server (PC) 109, image reading apparatus (scanner) 110, printer servers (PCs) 114 and 117, digital copying machine 116, imaging processing unit (PC) 119, and backbone 140. Referring to FIG. 1, reference numerals 100, 120, and 130 denote LANs (Local Area Networks).

This arrangement will be described in detail. The network printer 102 has an open architecture. The printer 102 is connected to the network (LAN 100) through the network board (NB) 101. The network board (NB) 101 is connected to the LANs 100, 120, and 130 through an Ethernet (registered trademark) (a LAN having a bus structure jointdeveloped by Xerox US, DEC, and Intel) interface 10Base-2 with a coaxial connector or a 10Base-T (10Base: a standard about a LAN transmission rate and the like defined by IEEE) local area network interface having RJ-45 (an 8-pin modular jack).

The plurality of personal computers such as the PCs 103, 104, and 109 are also connected to the LANs 100 and 130. These PCs 103, 104, and 109 can communicate with the NB 101 under the control of the network operating system. Hence, one of the PCs, e.g., the PC 103 can be used as a PC that manages network devices. The printer 105 may be locally connected to the PC 104 as a local printer. The PC 106 that functions as a file server is connected to the LAN 100. The PC 106 manages access to files stored in the large-capacity network disk 107.

The PC 104 that functions as a printer server manages printing using the locally connected printer 105 or the printer 102 at a remote site. The PC 114 that functions as a printer server also manages printing using the locally connected printer 115 or the printer 102 at the remote site. In addition, an image reading apparatus (scanner) such as the locally connected image reading apparatus (scanner) 110 or the image reading apparatus (scanner) 108 at a remote site can be managed by causing the PC 109 to function as a scanner server. The image reading apparatus (scanner) 108 is connected to the LAN 100 through an NB (not shown). The digital copying machine 116 provides a function as a printer or scanner under the management/control of the imaging processing unit 117.

In the network shown in FIG. 1, for efficient communication between various network members, network software such as Novell (registered trademark) or UNIX (registered trademark) can be used. For example, software such as Netware (registered trademark) available from Novell can be used. This software package is described in detail in an online documentation (enclosed in a Netware (registered trademark) package from Novell) enclosed in a Netware (registered trademark) package, and a description thereof will be omitted.

Each PC is formed from a general PC capable of generating a data file, transmitting the generated data file to the LAN 100 or receiving a file from the LAN 100, and displaying and processing the file, or displaying the file, or processing the file.

FIG. 1 shows personal computers (PCs). However, any other computer devices appropriate for executing network software can be used. For example, when UNIX (registered trademark) software is used, UNIX (registered trademark) workstations may be connected to the network. These workstations are used together with the PCs shown in FIG. 1.

Normally, the LAN 100 provides services to a relatively local user group, e.g., a user group of one floor or a plurality of continuous floors in one building. If users are separated from each other, e.g., they are in different buildings or in different regions (prefectures), a WAN (Wide Area Network) may be formed.

A WAN is basically a group of LANs, which is formed by connecting several LANs through high-speed digital lines such as ISDN (Integrated Services Digital Network). For example, a WAN is formed by connecting the LANs 100 and 120 through the backbone 140, as shown in FIG. 1. The devices connected to the LANs 100, 120, and 130 can access the function of each device connected to another LAN through the WAN connection.

Figure 2:
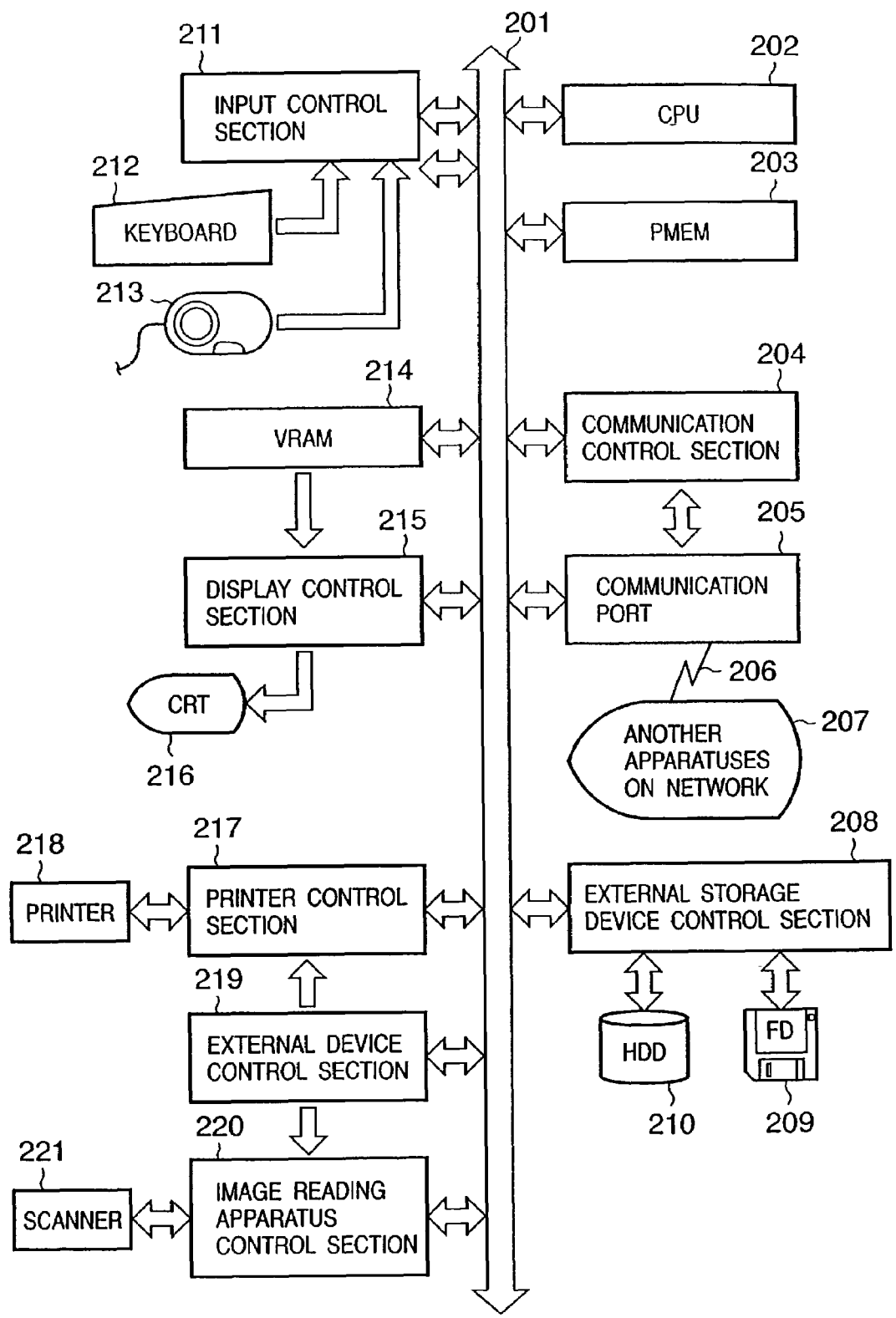
FIG. 2 is a block diagram showing the arrangement of the control system of the information processing apparatus according to the first and second embodiments of the present invention.

FIG. 2 is a block diagram showing the arrangement of the control system of the information processing apparatus (data processing apparatus) that can be used as the charging management apparatus and peripheral device using apparatus of the present invention. This information processing apparatus (data processing apparatus) comprises a system bus 201, CPU 202, PMEM (program memory) 203, communication control section 204, communication port 205, external storage device control section 208, floppy (registered trademark) disk 209, hard disk 210, input control section 211, keyboard 212, mouse 213, video memory (VRAM) 214, display control section 215, CRT 216, printer control section 217, external device control section 219, and image reading apparatus control section 220.

This information processing apparatus (data processing apparatus) is designed to be able to communicate with another information processing apparatus (data processing apparatus) to which a predetermined peripheral device (such as a printer, scanner, modem, or complex image processing apparatus) is locally connected, through a communication medium (not shown), e.g., a LAN such as Ethernet (registered trademark) by a predetermined protocol.

This arrangement will be described in detail. The sections of the information processing apparatus are connected to the system bus 201. The CPU (Central Processing Unit) 202 controls the entire information processing apparatus. The PMEM (program memory) 203 stores a program for executing processing according to the present invention. The program for executing processing according to the present invention is appropriately selected and loaded from the hard disk 210 by the CPU 202 and executed by the CPU 202. Data input from the keyboard 212 is stored as code information in the PMEM 203 that also serves as a text memory.

The communication control section 204 controls input/output data at the communication port 205. The signal output from the communication port 205 is transmitted to the communication port of another apparatus 207 on the network through a communication line 206. Data exchange between the information processing apparatus and a printer or image reading apparatus (scanner) shared on the network is done through the communication control section 204. In this embodiment, a network such as a LAN will be described. However, even when the communication port and communication line connected to the communication control section 204 are general public lines, the present invention can be applied.

The external storage device control section 208 controls access to a data file disk, e.g., the floppy (registered trademark) disk (to be referred to as an FD) 209 or the hard disk (to be referred to as an HD)210. Input devices such as the keyboard 212 and mouse 213 are connected to the input control section 211. The operator operates the keyboard 212, thereby inputting an operation instruction to the system. The CRT device (CRT) 216 displays various images. To process and indicate image information on the CRT 216, a pointing device (to be referred to as a PD) is used. In this embodiment, the mouse 213 is used. With the mouse 213, the cursor on the CRT 216 is arbitrarily moved in the X- and Y directions, and a command icon on the command menu is selected, thereby instructing processing. In addition, an editing target or drawing position is also instructed.

Draw data (bitmap data) to be displayed on the CRT 216 is bitmapped on the video memory (to be referred to as a VRAM) 214. The draw data is appropriately read out from the VRAM 214 through the display control section 215, and its contents are displayed on the CRT 216. The printer control section 217 controls data output to a printer 218 connected to the information processing apparatus. The image reading apparatus control section 220 controls image reading by an image reading apparatus (scanner) 221 connected to the information processing apparatus. The external device control section 219 controls the operation of an external device through the printer control section 217 or image reading apparatus control section 220.

In this embodiment, an image reading apparatus sharing server (as a charging management apparatus) (to be described later) and a shared image reading apparatus client PC (as a peripheral device using apparatus) (FIGS. 3 and 7) basically have the arrangement shown in FIG. 2. The image reading apparatus sharing server does not have the printer control section 217. The shared image reading apparatus client PC does not have the printer control section 217 and image reading apparatus control section 220.

That is, the image reading apparatus control section 220 and image reading apparatus 221 are indispensable for the image reading apparatus sharing server (to be described later). However, the shared image reading apparatus client PC side can use, through the communication control section 204 and communication port 205, the image reading apparatus control section 220 and image reading apparatus 221 shared on the image reading apparatus sharing server side, as described above.

In this embodiment, the program stored in the ROM may be stored in the storage medium such as the hard disk (HD) 210 or floppy (registered trademark) disk (FD) 209 directly connected to the information processing apparatus. The program may be stored on another apparatus on the network. The program of the present invention can be supplied to the system or apparatus through the storage medium such as the hard disk 210 or floppy (registered trademark) disk 209 or the network.

First Embodiment

Charging processing in sharing a locally connected image reading apparatus as the first object of the present invention will be described next.

<Mechanism of System Which Shares Image Reading Apparatus>

As a system that shares an image reading apparatus, the arrangements of a shared image reading apparatus, server, and client PC, and the internal arrangement of each PC will be described.

Figure 3:
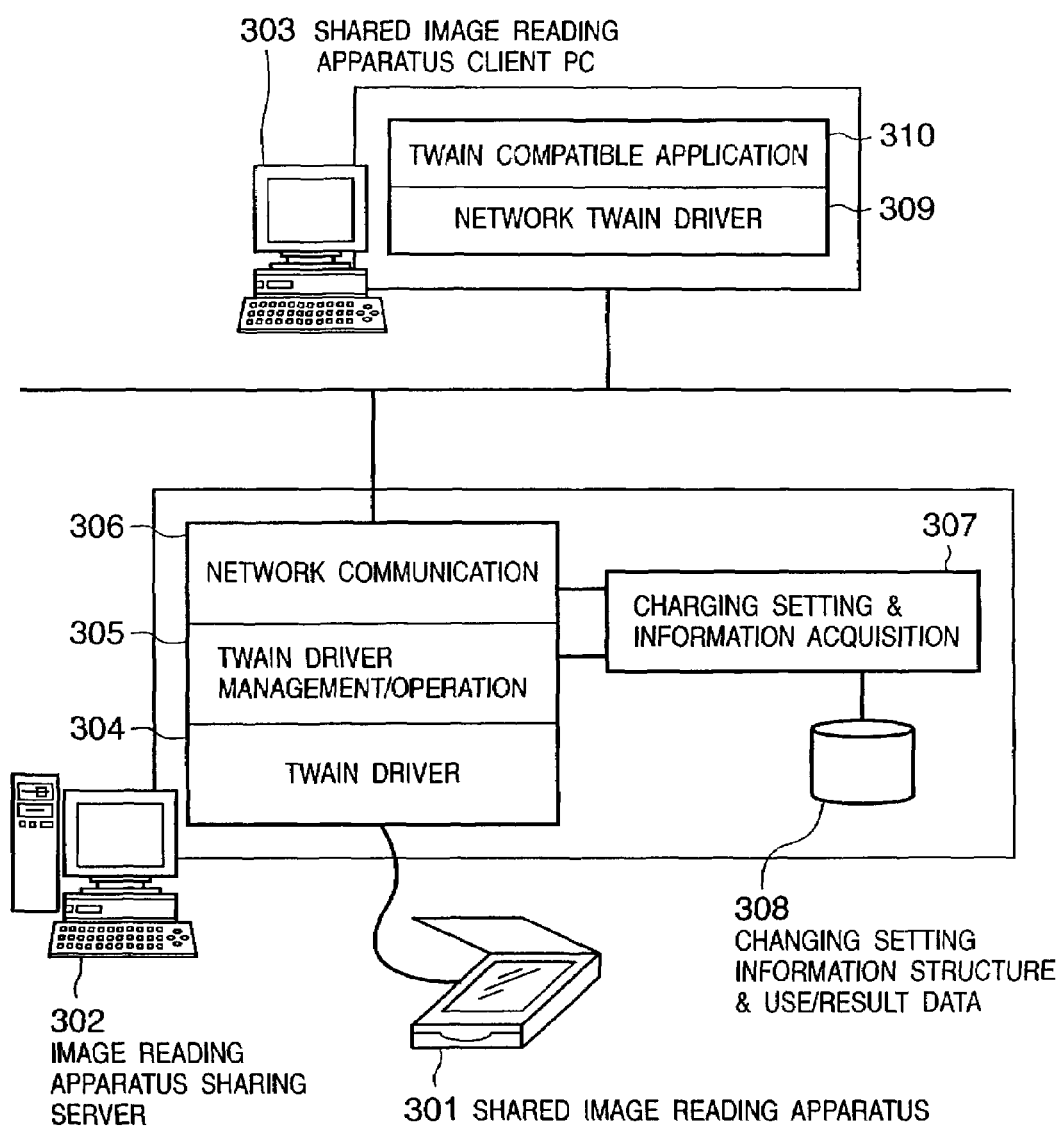
FIG. 3 is a diagram showing the arrangement of a system which manages sharing and charging of an image reading apparatus according to the first embodiment of the present invention.

FIG. 3 is a diagram showing the mechanism of a sharing and charging system for a locally connected image reading apparatus according to the first embodiment of the present invention. This system comprises a shared image reading apparatus 301, an image reading apparatus sharing server 302 serving as the charging management apparatus of the present invention, and a shared image reading apparatus client PC 303 serving as the peripheral device using apparatus of the present invention. Referring to FIG. 3, reference numeral 304 denotes a TWAIN driver layer; 305, a TWAIN driver management/operation layer; 306, a network communication layer; 307, a charging setting & information acquisition module layer; 308, charging setting information structure & use/result data; 309, a network TWAIN driver layer; and 310, a TWAIN compatible application layer. The components 304 to 308 are arranged in the image reading apparatus sharing server 302. The components 309 and 310 are arranged in the shared image reading apparatus client PC 303.

As shown in FIG. 3, in the first embodiment of the present invention, the lowermost layer that operates the image reading apparatus depends on a device driver (control software) attached to an individual image reading apparatus. The shared image reading apparatus 301 is connected to the PC 302 serving as the image reading apparatus sharing server by a connection method such as parallel, SCSI (Small Computer System Interface), or USB (Universal Serial Bus).

In the image reading apparatus sharing server 302, the lowermost layer is a module layer of a TWAIN (standard software interface for use of an image reading apparatus) source. This is the TWAIN driver layer 304 which exchanges information with an external device through a connection port. In this description, the TWAIN driver is used. However, the present invention is not particularly limited to this, and any other I/F standard can be used.

The TWAIN driver management/operation layer 305 is a module layer that manages the TWAIN driver layer 304 using a TWAIN I/F, receives a use request of the shared image reading apparatus 301 from another PC through the network communication layer 306, or acquires an image or information (capability) corresponding to the received request from the TWAIN driver layer 304 and transmits the acquired image or information to the requesting PC through the network communication layer 306. The image reading apparatus sharing server function is implemented by the TWAIN driver management/operation layer (module layer) 305.

In the image reading apparatus sharing server 302, the charging setting & information acquisition module layer 307 is a module which executes charging setting and information collection as a characteristic feature of the present invention. The charging setting & information acquisition module layer 307 realizes display processing of displaying a charging condition settling window, management processing of managing a set content as a charging setting information structure, collection processing of collecting use information in the TWAIN driver management/operation layer (module layer) 305 in collaboration with the module layer 305 which controls sharing processing, generation processing of generating actual charging data using the acquired use information and charging setting information structure, and holding/update processing of holding and updating, as the data region 308, the charging setting information structure under management, the acquired use information, and the actual charging result data.

For an acquisition instruction of a charging setting information structure from another client PC, processing of directly receiving the request from the network communication layer 306 and responding to the request may be executed. Details of this processing will be described in the second embodiment.

On the other hand, the shared image reading apparatus client PC 303 has the TWAIN compatible application layer 310 for acquiring a TWAIN compatible image. The network TWAIN driver layer 309 is invoked from the application of the TWAIN compatible application layer 310. The network TWAIN driver of the network TWAIN driver layer 309 serving as one of TWAIN drivers transmits, in accordance with an instruction from the application, a request to the image reading apparatus sharing server 302 having a TWAIN driver I/F or transfers an image or information sent from the image reading apparatus sharing server 302 to the application through the network.

In this way, the image reading apparatus sharing server 302 side manages and operates the local TWAIN device and exchanges information with the network TWAIN driver layer 309 on the shared image reading apparatus client PC 303 side. In addition, the shared image reading apparatus client PC 303 side exchanges information with the image reading apparatus sharing server 302 through the network on the basis of a request from the TWAIN compatible application layer 310 while behaving as if it were a local TWAIN device.

<Charging Setting Window>

FIG. 4 shows an example of charging setting according to the first embodiment of the present invention. When a setting instruction is issued by the charging setting & information acquisition module layer 307 shown in FIG. 3, the charging setting window shown in FIG. 4 is displayed on the CRT 216 of the information processing apparatus. However, the present invention is not limited to these charging setting method and contents.

Referring to FIG. 4, a check box 401 is used to set whether charging is to be executed. A list 402 is used to register charging classification, target, price, and other actions. For example, list data 403 represents that the classification is "user", the target user is Mr. "Hongo", and as for the price, he will be charged ¥100 for use of once. Similarly, list data 404 represents that the classification is "user", the target user is Mr. "Fujisawa", and as for the price, he will be charged ¥80 for a sheet read.

List data 405 represents that the classification is "group", the target user is a user belonging to "first accounting section", as for the price, a group member will be charged ¥1,000 for 100 sheets, and a confirm notification is sent to the manager for every 100 sheets. These settings can be added by an "add" button 406. Alternatively, a list can be selected and deleted by a "delete" button 407.

<Charging Setting Information Structure>

Figure 5:
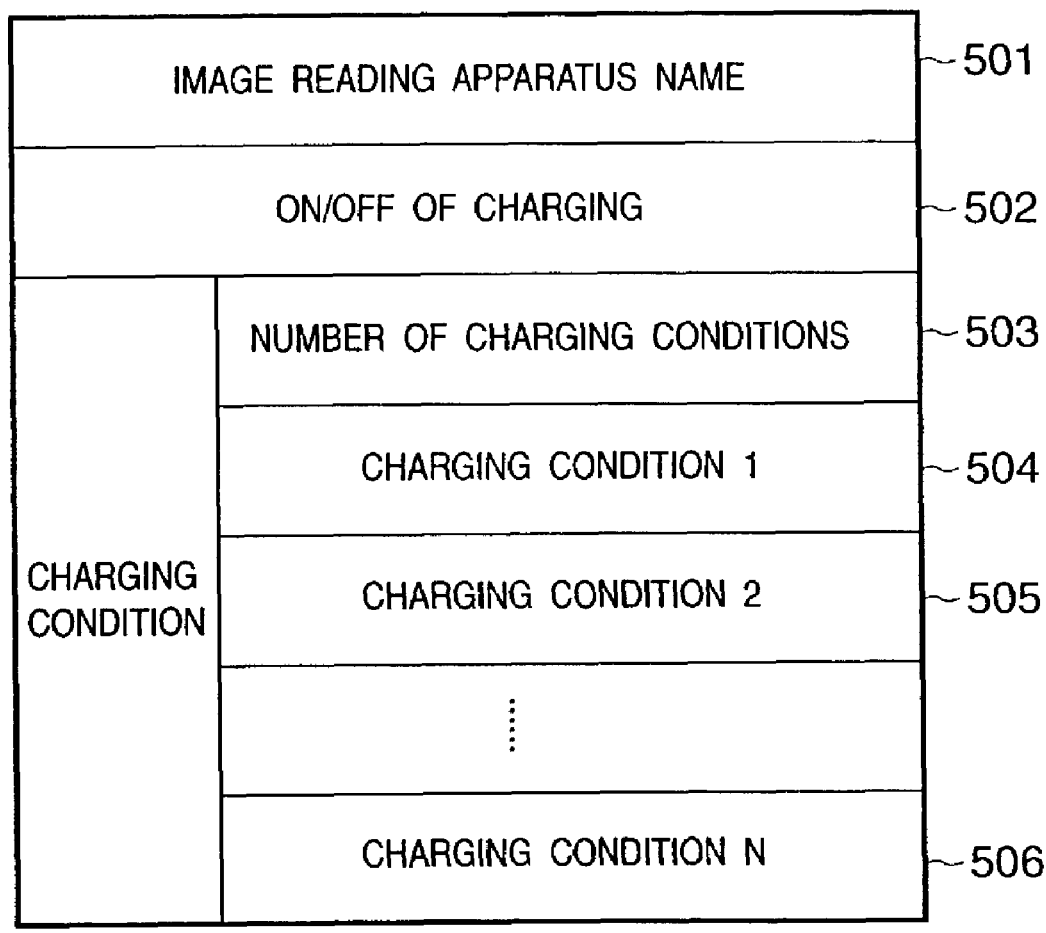
FIG. 5 is an explanatory view showing a charging setting information structure according to the first embodiment of the present invention.

The pieces of information set in the charging setting window shown in FIG. 4 are stored as a charging setting information structure. The charging setting information structure will be described with reference to FIG. 5. This charging setting information structure is merely an example, and the present invention is not particularly limited to this.

The name of the target image reading apparatus is set in a portion 501. Information representing whether the image reading apparatus should execute charging processing set by checking the check box 401 in FIG. 4 is set in a portion 502. The number of lists registered with the charging conditions 402 in FIG. 4 is set in a portion 503. The contents of each charging condition are set in portions 504, 505, and 506. When actual sharing data is acquired from another PC on the basis of the data of the charging setting information structure, charging result data is generated and updated. The data of the charging setting information structure is used to respond to a charging setting information structure acquisition instruction from another PC.

The operation of the information processing system according to the first embodiment of the present invention having the above arrangement will be described next in detail on the basis of the flow chart shown in FIG. 6.

<Flow Chart in First Embodiment>

The flow chart of charging setting and set content storage processing will be omitted because this processing is done only to store data set in the setting window and can easily be estimated. Processing related to a charging setting information structure acquisition instruction from another PC can also easily be estimated and will be omitted.

Figure 6:
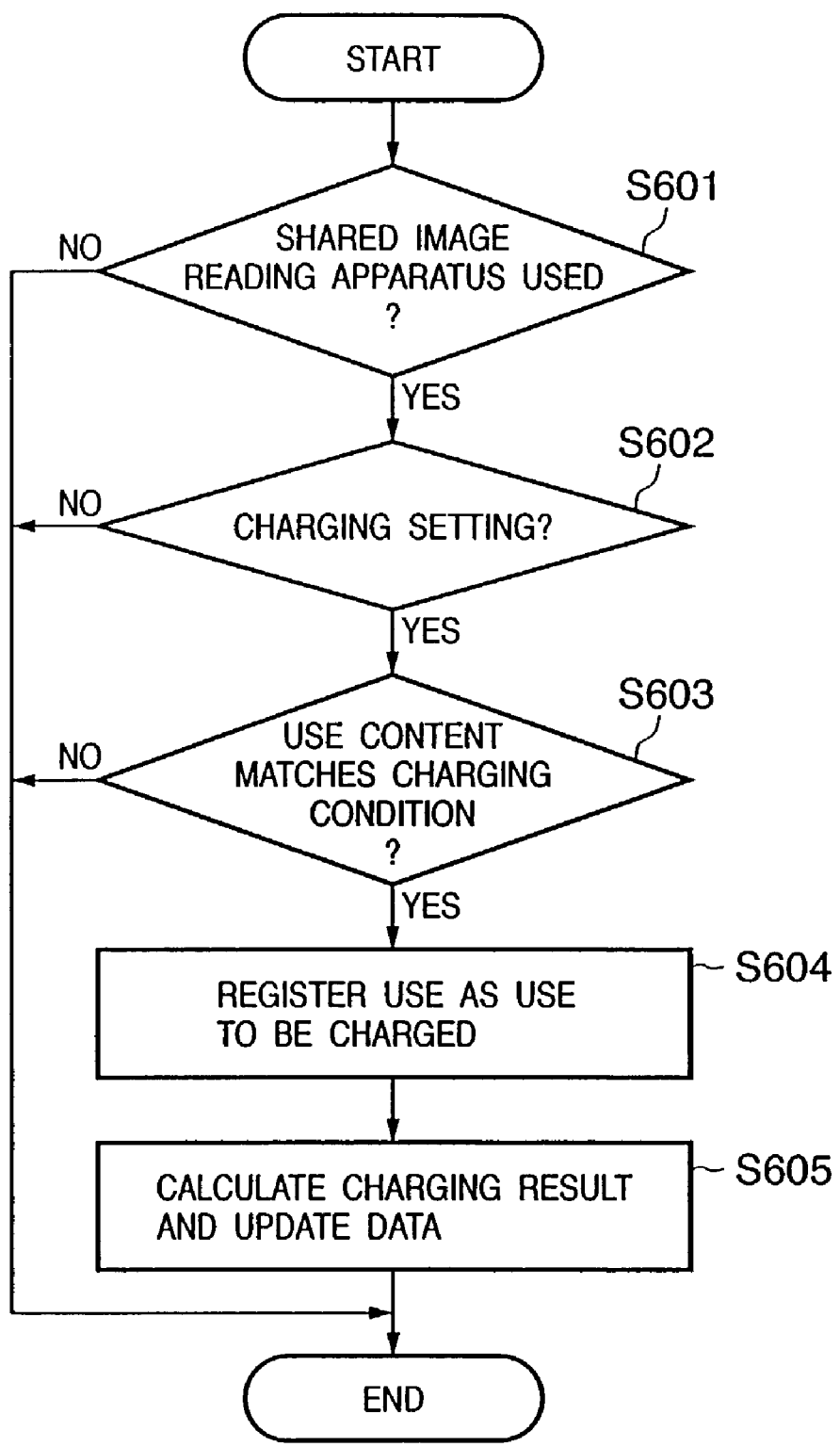
FIG. 6 is a flow chart showing charging result data generation processing related to sharing of the image reading apparatus according to the first embodiment of the present invention.

FIG. 6 is a flow chart showing processing in which the information processing apparatus shown in FIG. 2 acquires actual use information related to the locally connected image reading apparatus and generates charging result data using the acquired use information and charging setting information structure, according to the first embodiment of the present invention. This flow chart is executed by the CPU 202 on the basis of a program stored in the HD 210 shown in FIG. 2 or a storage medium (not shown).

In step S601, it is determined whether the locally connected image reading apparatus is shared, on the basis of the module layer 305 that controls the subject of processing of sharing the locally connected image reading apparatus. If NO in step S601, the processing is ended. If YES in step S601, it is determined in step S602 on the basis of the charging setting information structure ON/OFF information 502 whether charging setting has been done for sharing of the locally connected image reading apparatus.

If the charging setting information structure ON/OFF information 502 is OFF, charging setting has not been done for sharing of the locally connected image reading apparatus. Hence, the processing is ended. If the charging setting information structure ON/OFF information 502 is ON, charging setting has been done for sharing of the locally connected image reading apparatus. The flow advances to step S603. In step S603, it is determined whether a use content matching the corresponding charging condition is present, on the basis of the use information related to the locally connected image reading apparatus.

If NO in step S603, charging for use of the locally connected image reading apparatus is unnecessary, and the processing is ended. If YES in step S603, the flow advances to step S604. In step S604, the use of the locally connected image reading apparatus is registered as use for which charging is to be performed. In step S605, the charging result is calculated from the price of the corresponding charging condition and use content. The calculation result is stored and updated as charging result data. The processing is ended.

As described above, according to the first embodiment of the present invention, the image reading apparatus sharing server 302 executes control to store and manage the charging setting information structure based on charging setting related to sharing of the shared image reading apparatus 301 by the client PC 303, respond to an inquiry about acquisition of the charging setting information structure from the shared image reading apparatus client PC 303, collect, store, and manage use information related to sharing of the shared image reading apparatus 301 from the shared image reading apparatus client PC 303, and calculate, store, and manage the charging result for actual use of the shared image reading apparatus 301 on the basis of the use information and charging setting information structure. Hence, the following effect can be obtained.

When an individual locally connected image reading apparatus is shared by another PC, a charging system corresponding to various conditions can be constructed. The locally connected image reading apparatus, for which charging management has conventionally been impossible, can be used as a chargeable peripheral device.

Second Embodiment

As the second object of the present invention, charge/free display processing of indicating whether a shared image reading apparatus is subjected to charging will be described next.

<Acquisition of Charging Setting Information Structure of Shared Image Reading Apparatus At Client>

Figure 7:
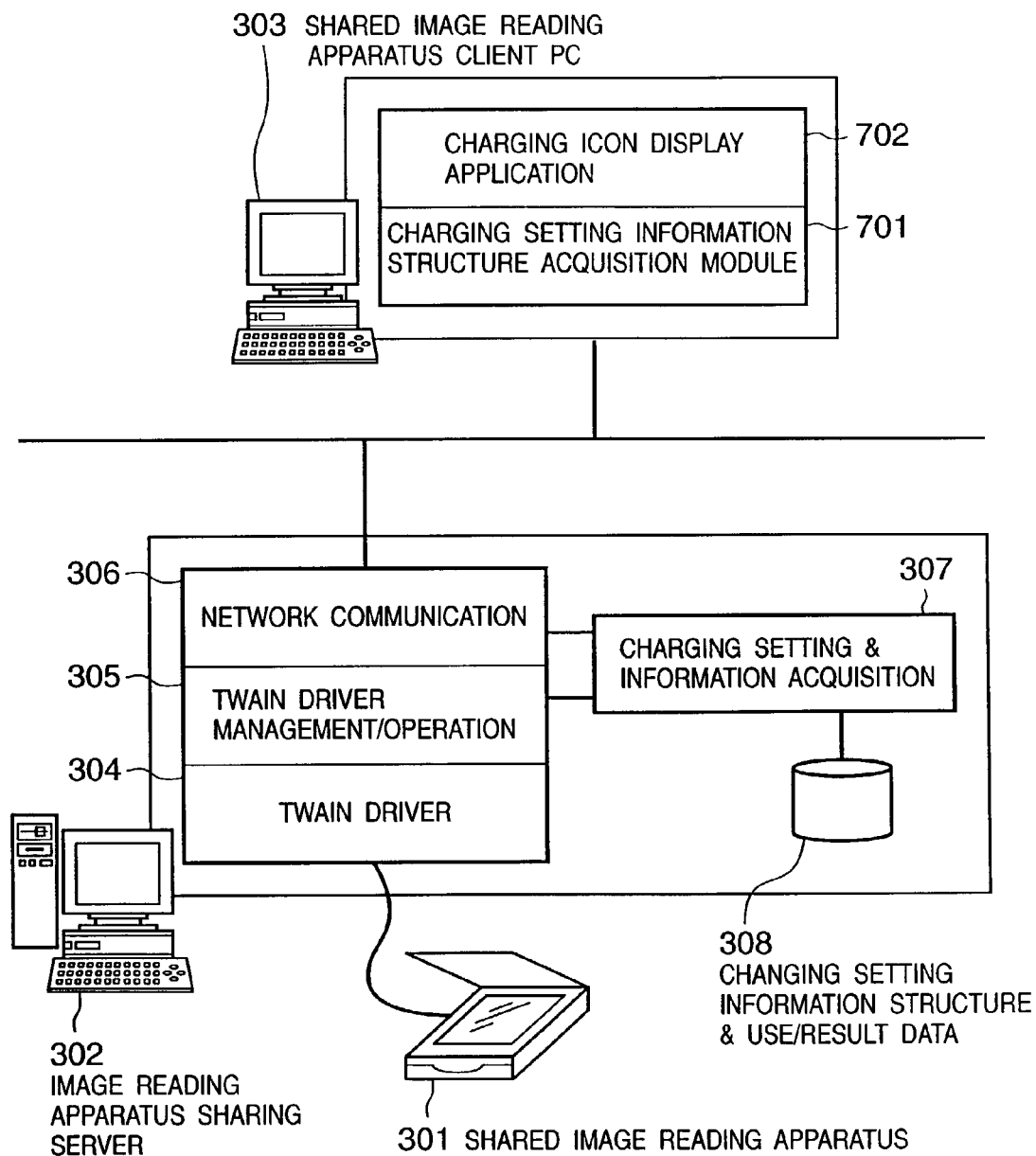
FIG. 7 is a diagram showing the arrangement of a system which manages sharing and charging of an image reading apparatus according to the second embodiment of the present invention.

FIG. 7 is a diagram showing the mechanism of a sharing and charging system for an image reading apparatus according to the second embodiment of the present invention. This system comprises a shared image reading apparatus 301, an image reading apparatus sharing server 302, and a shared image reading apparatus client PC 303. Referring to FIG. 7, reference numeral 304 denotes a TWAIN driver layer; 305, a TWAIN driver management/operation layer; 306, a network communication layer; 307, a charging setting & information acquisition module layer; 308, charging setting information structure & use/result data; 701, a charging setting information structure acquisition module layer; and 702, a charging icon display application layer. The components 304 to 308 are arranged in the image reading apparatus sharing server 302. The components 701 and 701 are arranged in the shared image reading apparatus client PC 303.

The internal arrangement related to acquisition of a charging setting information structure of the shared image reading apparatus 301 from the image reading apparatus sharing server 302 at the shared image reading apparatus client PC 303 will be described with reference to FIG. 7. The components 301 to 307 in FIG. 7 are almost the same as those described with reference to FIG. 3, and a description thereof will be omitted.

In the shared image reading apparatus client PC 303, the charging setting information structure acquisition module layer 701 sends a charging setting information structure acquisition request to the image reading apparatus sharing server (PC) 302 which shares an image reading apparatus to be used, in accordance with an acquisition request from the charging icon display application layer 702. The network communication layer 306 in the image reading apparatus sharing server (PC) 302 acquires this request and directly transmits it to the charging setting & information acquisition module layer 307. Upon receiving the request, the charging setting & information acquisition module layer 307 returns the current charging setting information structure to the charging setting information structure acquisition module layer 701 as a response to the request through the network communication layer 306.

The charging setting information structure acquisition module layer 701 acquires the charging setting information structure and transfers it to the charging icon display application layer 702. Using the acquired charging setting information structure, the charging icon display application layer 702 displays, on an icon on the display section, a mark representing whether the user will be charged for use of the shared image reading apparatus 301 to be used.

<Charging Mark Display Method for Image Reading Apparatus>

Figure 8:
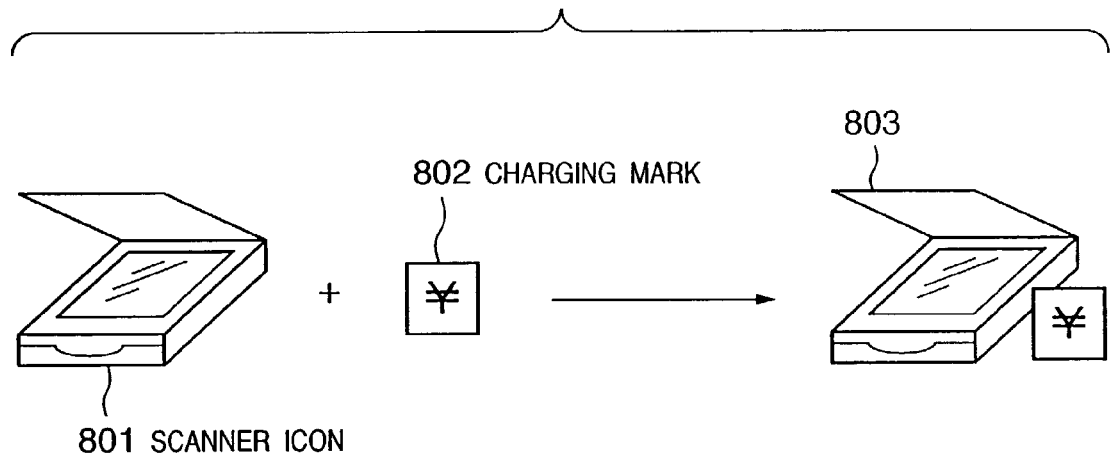
FIG. 8 is an explanatory view showing a display example of an icon that indicates the image reading apparatus and a charging mark added to the icon according to the second embodiment of the present invention.

FIG. 8 shows an example in which PCs and various peripheral devices on the network are represented by icons to allow the user to easily visually recognize them, and a mark is added to an icon to indicate that the user will be charged for use of the image reading apparatus at the client PC of the system that shares the usable image reading apparatus.

An icon 801 means a normal image reading apparatus. A mark 802 is added when the user will be charged for use of the image reading apparatus at his client PC. When the pieces of information represented by the icon 801 and mark 802 are combined, display 803 is done. With this display, the user can use the shared image reading apparatus while recognizing in advance that he will be charged for use of the image reading apparatus.

Figure 9:
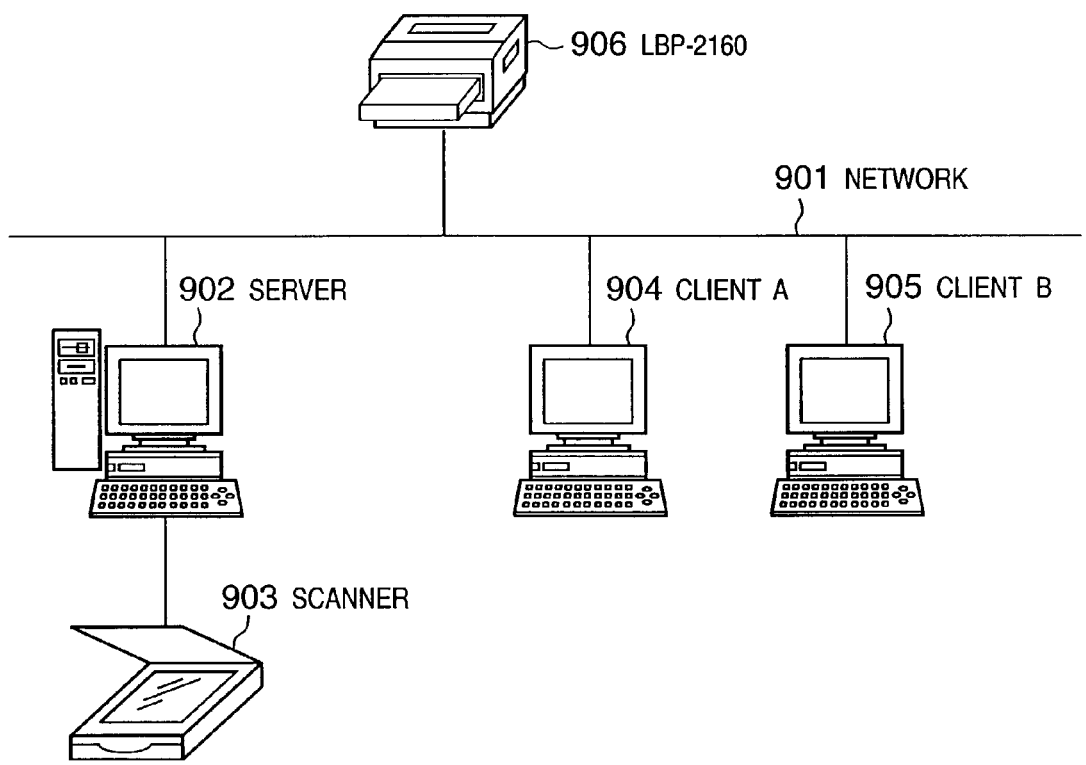
FIG. 9 is a diagram showing the arrangement of a network constituted by image reading apparatuses, PCs, and the like according to the second embodiment of the present invention.

FIG. 9 shows an actual network arrangement, represented using the display shown in FIG. 8. An image reading apparatus A 903 and image reading apparatus sharing server PC 902 are connected through a network 901. As client PCs for the image reading apparatus sharing server PC 902, a client PC 904 (client A) and client PC 905 (client B) are present. A printer 906 is a network printer directly connected to the network 901.

These PCs and peripheral devices are network components connected to the network 901. For the image reading apparatus A 903 as one of the network components, charging setting has been done for the users of the client PCs 904 and 905 by sharing processing. For this reason, when the image reading apparatus A 903 is displayed by the virtual network display means of, e.g., the client PC 904, a charging mark is displayed on an icon that represents the image reading apparatus A 903.

Figure 10:
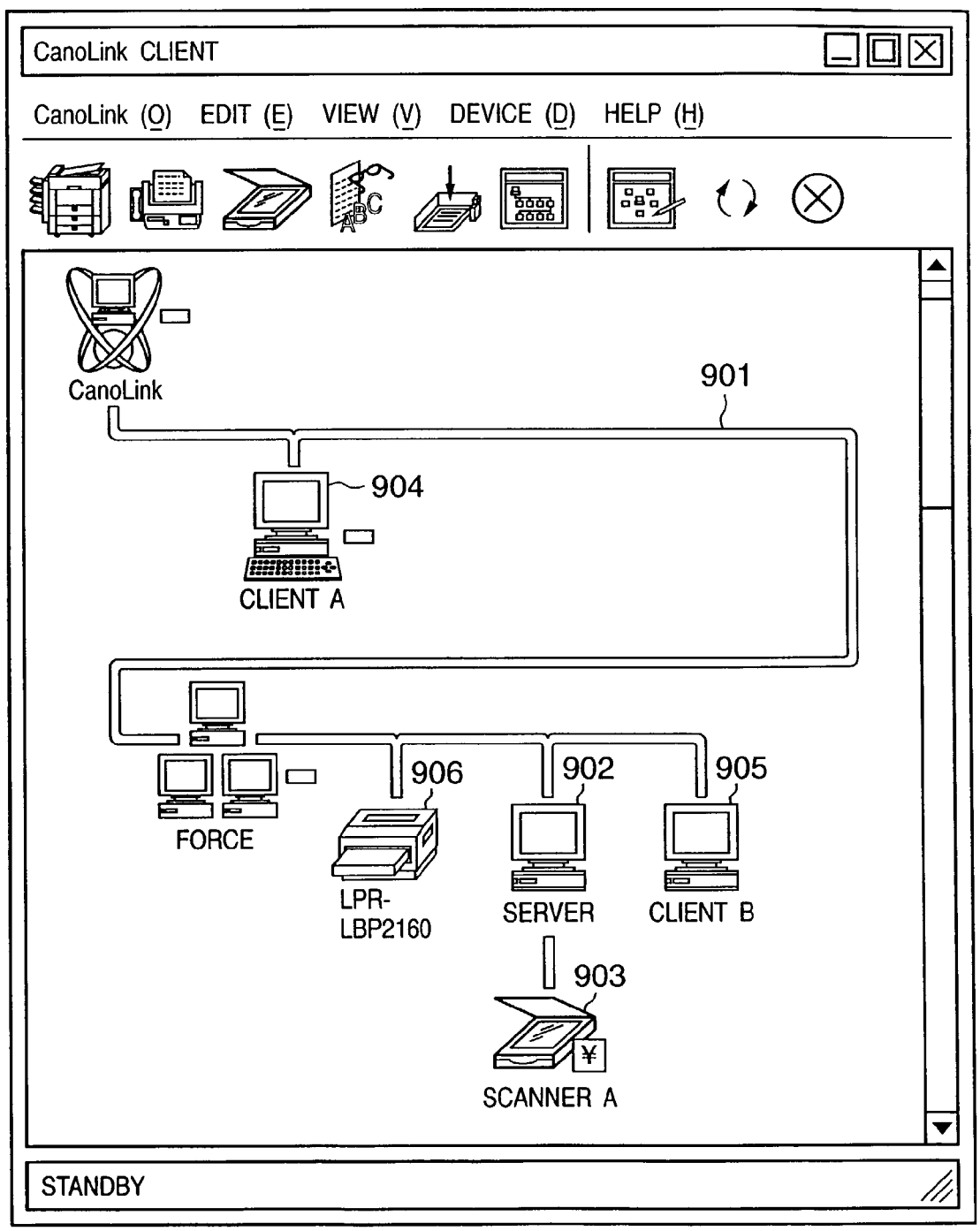
FIG. 10 is an explanatory view showing an example wherein the network arrangement shown in FIG. 9 is displayed on the CRT of a client PC according to the second embodiment of the present invention.

FIG. 10 shows an example wherein the actual network arrangement shown in FIG. 9 is displayed on the screen of the client PC 904, which serves as a virtual network display means as the display means of the present invention. That is, the actual network arrangement shown in FIG. 9 is expressed on the screen of the client PC 904. The PCs/peripheral devices 902 to 906 are displayed on the line 901 that represents the network. Referring to FIG. 10, a charging mark representing that the charging system charges for use of the image reading apparatus is displayed on the icon that expresses the image reading apparatus 903.

The present applicant has already filed an application of a data processing apparatus, in which the resource information structure (e.g., an information structure containing information of a resolution and the like) of a peripheral device and the statuses of a PC and peripheral device are acquired by communication with the PC and peripheral device connected to a communication medium, the acquired resource information structure and statuses are stored and managed, the connection relationship with respect to a virtual network path is displayed on a display section using an icon for each function, with which the system arrangement can be identified for each function, on the basis of the resource information structure and statuses, a PC serving as a data input side and a peripheral device serving as a data output side are indicated, it is determined whether the combination of the indicated PC and peripheral device is valid, the shape of icon on the display section is changed on the basis of the determination result, the function to be executed by the indicated PC and peripheral device is determined, a setting window matching the determined function is displayed, and the determined function is executed.

In the second embodiment of the present invention, which is based on the above application, when it is determined that the user will be charged for use of the image reading apparatus, a charging mark is added to the icon of the image reading apparatus, as will be described later in detail.

The operation of the information processing system according to the second embodiment of the present invention with the above arrangement will be described next in detail on the basis of the flow chart shown in FIG. 11.

<Flow Chart in Second Embodiment>

In the second embodiment of the present invention, processing in which the shared image reading apparatus client PC 303 acquires a charging setting information structure from the image reading apparatus sharing server 302 and determines on the basis of the acquired charging setting information structure whether the user will be charged for use of the shared image reading apparatus 301, and when the user will be charged for use of the shared image reading apparatus 301, a charging mark is displayed on an icon that represents the image reading apparatus.

Figure 11:
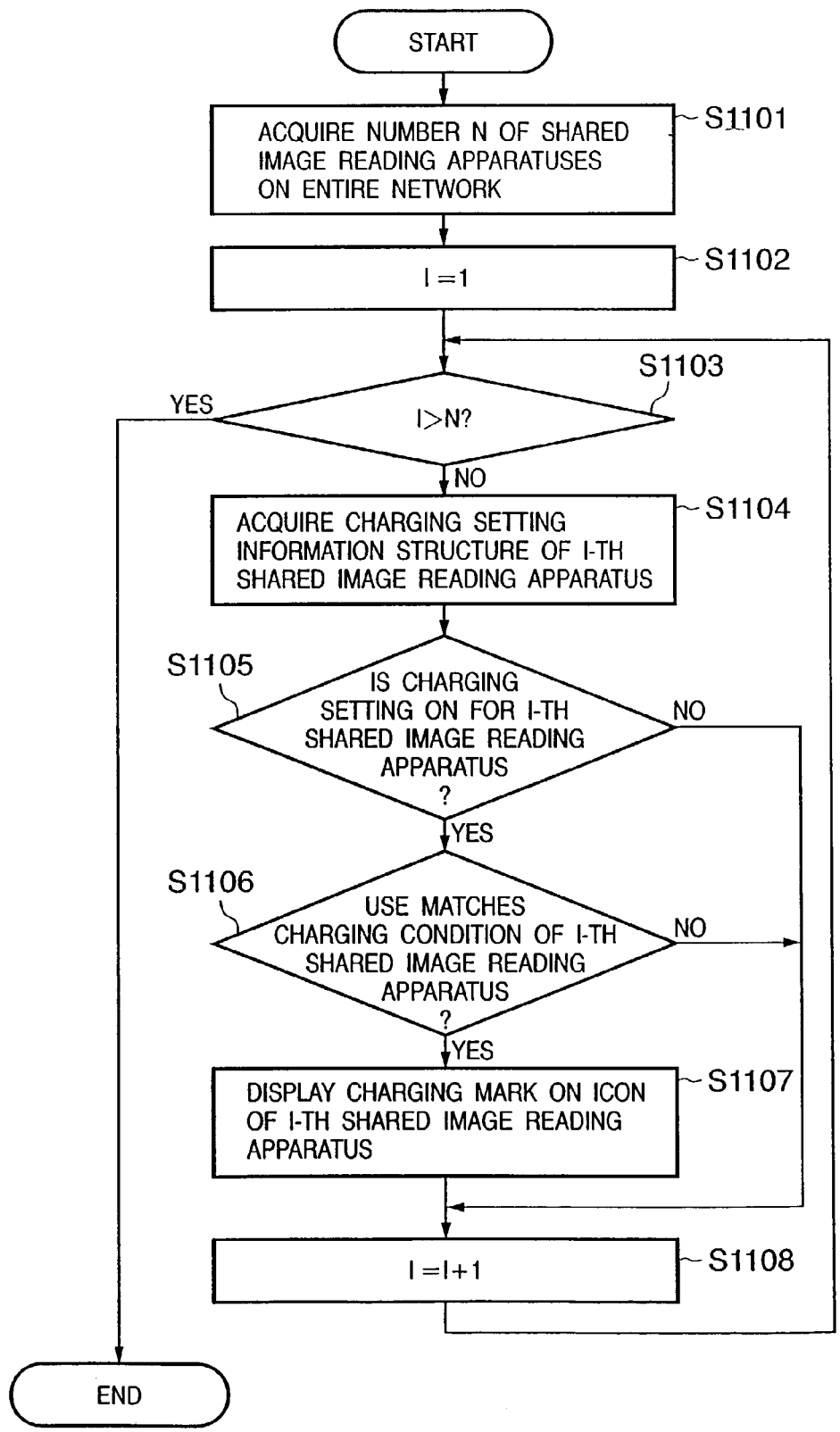
FIG. 11 is a flow chart showing charging setting information structure acquisition processing and charging setting information structure display processing according to the second embodiment of the present invention.

FIG. 11 is a flow chart showing the flow of a control program which determines about use of the image reading apparatus whether a charging mark is to be displayed on the icon of the image reading apparatus. This flow chart is executed by a CPU 202 on the basis of a program stored in an HD 210 shown in FIG. 2 or a storage medium (not shown).

In step S1101, a list of shared image reading apparatuses shared by PCs that are present on a LAN 100 shown in FIG. 1 is made, and the number N of shared image reading apparatuses is acquired. In step S1102, a counter variable I is initialized to 1. In step S1103, the counter variable I and the number N of shared image reading apparatuses are compared. If the counter variable I is equal to or smaller than the number N of shared image reading apparatuses (if the counter variable I is not larger than the number N of shared image reading apparatuses), the flow advances to step S1104. If the counter variable I is larger than the number N of shared image reading apparatuses, the processing is ended.

In step S1104, the charging setting information structure (FIG. 5) of the Ith shared image reading apparatus is acquired. The charging setting information structure of each shared image reading apparatus is acquired by inquiring of each image reading apparatus sharing server about it. The flow advances to step S1105 to determine whether charging setting is ON, on the basis of the acquired charging setting information structure of the Ith shared image reading apparatus. If NO in step S1105, no charging mark needs to be displayed on the icon representing the shared image reading apparatus. Hence, the flow advances to step S1108. If YES in step S1105, the flow advances to step S1106.

In step S1106, it is determined on the basis of each charging condition whether use at the user's PC matches the charging condition of the charging setting information structure. If YES in step S1106, the user will be charged for use of the shared image reading apparatus by charging setting. The flow advances to step S1107 to display a charging mark added to the icon representing the shared image reading apparatus. Then, the flow advances to step S1108. If NO in step S1106, the user is not charged for use at his PC, though charging setting has been done. The flow advances to step S1108 without displaying the charging mark on the icon representing the shared image reading apparatus.

In step S1108, to make the next shared image reading apparatus undergo processing of determining whether the charging mark is to be displayed, the counter variable I is incremented by one. Then, the flow returns to step S1103 to repeat the above series of processes. When the processing of determining whether the charging mark is to be displayed is ended for all shared image reading apparatuses, the processing is ended.

As described above, according to the second embodiment of the present invention, the shared image reading apparatus client PC 303 executes control to acquire the charging setting information structure related to sharing of the shared image reading apparatus 301 from the image reading apparatus sharing server 302, store and manage the acquired charging setting information structure, determine on the basis of the charging setting information structure whether the user will be charged for use of the shared image reading apparatus 301, and if it is determined that the user will be charged for use of the shared image reading apparatus 301, display a charging mark added to the icon representing the shared image reading apparatus 301. Hence, the following effect can be obtained.

When an individual shared image reading apparatus is used, display (charging mark display) that allows the user to easily visually recognize in advance whether he will be charged for use from the apparatus of his own can be provided. The user can use the image reading apparatus while recognizing in advance that he will be charged for use of the image reading apparatus.

In the first and second embodiments of the present invention, the arrangements shown in FIGS. 1, 3, and 7 have been exemplified as the system arrangement of the network devices. However, the present invention is not limited to these arrangements. The numbers of installed image reading apparatuses, printers, copying machines, and PCs can be arbitrary. The network can also be installed in an arbitrary form.

The present invention may be applied to a system constituted by a plurality of devices or an apparatus comprising a single device. The object of the present invention is achieved even by supplying a medium such as a storage medium which stores software program codes for implementing the functions of the above-described embodiments to the system or apparatus and causing the computer (or a CPU or MPU) of the system or apparatus to read out and execute the program codes stored in the medium such as the storage medium.

In this case, the program codes read out from the medium such as the storage medium implement the functions of the above-described embodiments by themselves, and the medium such as the storage medium which stores the program codes constitutes the present invention. As the medium such as the storage medium for supplying the program codes, for example, a floppy (registered trademark) disk, hard disk, optical disk, magnetooptical disk, CD-ROM, CD-R, magnetic tape, nonvolatile memory card, ROM, or download through a network can be used.

The functions of the above-described embodiments are implemented not only when the readout program codes are executed by the computer but also when the OS running on the computer performs part or all of actual processing on the basis of the instructions of the program codes.

The functions of the above-described embodiments are also implemented when the program codes read out from the medium such as the storage medium are written in the memory of a function expansion board inserted into the computer or a function expansion unit connected to the computer, and the CPU of the function expansion board or function expansion unit performs part or all of actual processing on the basis of the instructions of the program codes.

As has been described above, according to the charging management apparatus of the present invention, use information related to sharing of an image reading apparatus is collected from the peripheral device using apparatus, charging information for actual use of the image reading apparatus by the peripheral device using apparatus is calculated on the basis of the collected use information and a charging setting information structure corresponding to charging setting related to sharing of the image reading apparatus by the peripheral device using apparatus, and the calculated charging information is stored and managed. Hence, a charging system corresponding to various conditions can be constructed when a plurality of apparatuses share an image reading apparatus that is locally connected (i.e., connected not to a network but to a predetermined apparatus). The locally connected image reading apparatus, for which charging management has conventionally been impossible, can be used as a chargeable peripheral device.

In addition, according to the peripheral device using apparatus of the present invention, a charging setting information structure related to sharing of an image reading apparatus is acquired from the charging management apparatus, the acquired charging setting information structure is stored and managed, it is determined on the basis of the charging setting information structure whether the user will be charged for use of the image reading apparatus, and if it is determined that the user will be charged for use of the image reading apparatus, a charging mark is added to the icon that represents the image reading apparatus. Hence, in displaying the icon representing a shared image reading apparatus, the user can obtain visual information that represents whether he will be charged for use of the shared image reading apparatus at the apparatus of his own. Since the user can easily grasp that he will be charged for use of the shared image reading apparatus by charging processing, a desired shared image reading apparatus can be used without inquiring of the manager of an individual shared image reading apparatus about charging.

Furthermore, even in the charging management system of the present invention, the charging management method and charging display method of the present invention, the storage medium of the present invention, and the program of the present invention, a locally connected image reading apparatus, for which charging management has conventionally been impossible, can be used as a chargeable peripheral device. In addition, a desired shared image reading apparatus can be used without inquiring of the manager of an individual shared image reading apparatus about charging.

As many apparently widely different embodiments of the present invention can be made without departing from the spirit and scope thereof, it is to be understood that the invention is not limited to the specific embodiments thereof except as defined in the appended claims.

What is claimed is:

1. An image reading system in which a client apparatus connected, via a network, to a charging management apparatus to which an image scanner is locally connected,
    said client apparatus comprising:
        a requesting unit adapted to ask said charging management apparatus to read an image; and
        a receiving unit adapted to receive an image read by said image scanner from said charging management apparatus;
        an acquisition unit adapted to acquire, from said charge management apparatus, information indicating a setting relating to whether a use of said image scanner is set to be charged or not;
        a first determination unit adapted to determine whether said client apparatus matches a charging condition of said image scanner or not; and
        a display control unit adapted to control a display device to display information indicating the use of said image scanner is set to be charged if the information acquired by said acquisition unit indicating that the setting relating to said image scanner is set to be charged,
        wherein said display control unit does not control the display device to display the information indicating the use of said image scanner is set to be charged, if said first determination unit determines that said client apparatus does not match the charging condition of said image scanner even if the information acquired by said acquisition unit indicating that the setting relating to said image scanner is set to be charged, and
    said charging management apparatus comprising:
        a setting unit adapted to set whether a use of said image scanner is to be charged or not;
        a calculating unit adapted to calculate charge amount if said image scanner was used by said client apparatus and the use of said image scanner was set to be charged by said setting unit; and
        a storage unit adapted to store the charge amount.

2. A method for image reading in which a client apparatus connected, via a network, to a charging management apparatus to which an image scanner is locally connected, comprising:
    asking said charging management apparatus to read an image; and
    receiving an image read by said image scanner from said charging management apparatus;
    acquiring, from said charge management apparatus, information indicating a setting relating to whether a use of said image scanner is set to be charged or not;
    first determining whether said client apparatus matches a charging condition of said image scanner or not; and
    controlling a display device to display information indicating the use of said image scanner is set to be charged if the information acquired in said acquiring step indicating that the setting relating to said image scanner is set to be charged,
    wherein said controlling does not control the display device to display the information indicating the use of said image scanner is set to be charged, if said first determining step determines that said client apparatus does not match the charging condition of said image scanner even if the information acquired in said acquiring step indicating that the setting relating to said image scanner is set to be charged, and setting whether a use of said image scanner is to be charged or not;

calculating charge amount if said image scanner was used by said client apparatus and the use of said image scanner was set to be charged in said setting step; and storing the charge amount.

3. An image reading system according to claim 1, wherein said charging management apparatus further comprises, a second determination unit adapted to determine whether said image scanner was used by said client apparatus or not.

4. An image reading system according to claim 1, wherein the charging condition includes charging classification, target, and price at least.

* * * * *

UNITED STATES PATENT AND TRADEMARK OFFICE
CERTIFICATE OF CORRECTION

PATENT NO. : 7,319,537 B2
APPLICATION NO. : 10/136709
DATED : January 15, 2008
INVENTOR(S) : Koji Kikuchi It is certified that error appears in the above-identified patent and that said Letters Patent is hereby corrected as shown below:

Column 8, lines 1-3, delete "from Novell) enclosed in a Netware (registered trademark) package, and a description thereof be omitted." and insert --from Novell), and a description thereof will be omitted.--

Column 13, line 46, delete "701 and 701" and insert --701 and 702--

Signed and Sealed this

Twenty-fifth Day of November, 2008

JON W. DUDAS
*Director of the United States Patent and Trademark Office*